United States Patent [19]
Beck et al.

[11] 4,295,539
[45] Oct. 20, 1981

[54] AUXILIARY DRIVE SYSTEM

[75] Inventors: Richard A. Beck, West LaFayette; Glen T. Presley, Angola, both of Ind.

[73] Assignee: Parno Corporation, Brookston, Ind.

[21] Appl. No.: 100,426

[22] Filed: Dec. 5, 1979

[51] Int. Cl.³ .............................................. B60K 25/04
[52] U.S. Cl. ...................................... 180/243; 60/445; 60/489; 60/490
[58] Field of Search .......................... 180/242, 243, 307; 60/443, 445, 489, 490

[56] References Cited

U.S. PATENT DOCUMENTS

| | | | |
|---|---|---|---|
| 3,354,978 | 11/1967 | Budzich | 180/243 |
| 3,984,978 | 10/1976 | Alderson | 180/242 X |

FOREIGN PATENT DOCUMENTS

| | | | |
|---|---|---|---|
| 1186753 | 2/1965 | Fed. Rep. of Germany | 60/490 |
| 1228768 | 4/1971 | United Kingdom | 60/490 |

*Primary Examiner*—John A. Pekar
*Attorney, Agent, or Firm*—Edward L. Brown, Jr.

[57] ABSTRACT

A hydraulic auxiliary drive system for the normally non-driven wheels of a vehicle to assist the main wheels. The auxiliary drive comprises at least one variable displacement motor having a swash plate for driving at least one of the non-driven wheels, a variable displacement pressure compensated pump supplying the motor with a constant pressure regardless of vehicle speed, a spring for biasing each motor swash plate toward zero displacement, a servo connected to the motor swash plate for varying the displacement of the motor, and a pressure source for supplying the servo. A manually operated pressure control includes a solenoid-controlled variable orifice for controlling the pressure level supplied to the servo to vary the torque output of the normally non-driven wheels. A control valve is positioned between the pump and motor for disengaging and reversing the auxiliary drive. Another embodiment includes a second servo connected to the motor swash plate for decreasing the motor displacement. A pressure operated valve is located in a sensing passage connecting the pump outlet with the second servo and has a first position blocking pump pressure to the servo at all levels above the pressure compensating level of the pump, and a second position opening pump pressure to the second servo at a preset pressure level below the compensating level whereby when the pump reaches full stroke and is unable to maintain its compensating level, the valve opens causing the motor displacement to decrease.

11 Claims, 2 Drawing Figures

AUXILIARY DRIVE SYSTEM

BACKGROUND OF THE INVENTION

The present invention relates generally to hydraulic drive systems and more specifically to an add-on auxiliary drive system utilized on the steerable non-driven wheels of an agricultural tractor. Most farm tractors built today are of the conventional two-wheel drive type having two large mechanically driven rear wheels and a pair of smaller steerable front wheels which are not driven. Under most conditions, the conventional main drive wheels provide sufficient tractive effort to propel the tractor and pull the particular tillage implement. However, under certain conditions, additional tractive effort at varying levels is desirable when the main drive wheels begin to spin. Under such conditions quite often the conventional drive train is not utilizing the full horse power capacity of the tractor and that additional power capacity can be converted into hydraulic energy to drive the front steerable wheels of the tractor. This additional tractive force substantially boosts the drawbar pulling power of the tractor and also improves steering control. In varying soil conditions, it is also advantageous to be able to vary the amount of torque output from the auxiliary system.

DESCRIPTION OF THE PRIOR ART

Systems of the general type disclosed herein are shown in the following prior art U.S. patents and published applications:

U.S. Pat. No. 3,481,419 Kress
U.S. Pat. No. 3,736,732 Jennings, et al
U.S. Pat. No. B 432,969 Campbell et al.
U.S. Pat. No. B 526,445 Alderson.

Many of the patents listed above do teach a variety of means for increasing the torque on the auxiliary drive system. The patent to Kress U.S. Pat. No. 3,481,419 is a system which valves the auxiliary front wheels in parallel or in series, which of course, is one method of increasing torque but it must be done manually. The published application to Campbell (B 432,969) teaches a series parallel valving arrangement for varying the torque but also teaches the idea of electrically sensing the wheel speed and using that signal to control the auxiliary drive system. The Jennings U.S. Pat. No. 3,736,732 allows for a reduction in torque on the auxiliary system by gearing down the mechanical main transmission. The only way to increase the torque on the auxiliary wheels, is to brake the main drive wheels causing a pressure rise in the auxiliary system which, of course, is inefficient. The published application to Alderson (B 526,445) teaches an auxiliary system with the use of variable displacement motors which are flow and pressure compensated, wherein the motors destroke as the available pressure and flow are used by the accessories.

The present invention utilizes variable displacement motors to vary the torque output of the auxiliary drive rather than to provide priority flow to the accessories, as in the last mentioned patent.

It is therefore the principal object of the present invention to provide an auxiliary hydraulic drive system for the non-driven steerable wheels which varies the torque on the auxiliary system by changing the displacement on the variable displacement motors.

Another object of the present invention is to provide an auxiliary drive system with improved efficiency, particularly in the disengaged position.

Another object of the present invention is to provide an auxiliary drive system which is not speed limited by pump size.

The present invention is an auxiliary drive system for the steerable non-driven front wheels of a tractor and includes an engine-driven variable displacement pressure compensated pump which supplies two variable displacement motors connected to each non-driven front wheel respectively, in a parallel circuit through a divider valve which divides the flow from the pump to the individual motors regardless of the flow rate, allowing a pre-arranged flow differential between the motors for cornering. When the tractor encounters soil conditions wherein more torque is needed, the operator manually signals the system to increase the displacement of the auxiliary motors which in turn increase the torque output on the front wheels of the auxiliary system.

The invention will be more readily understood when the following description of certain embodiments are described in detail in conjunction with the drawings illustrating the invention in schematic form.

DESCRIPTION OF THE PREFERRED EMBODIMENT

Figure 1:
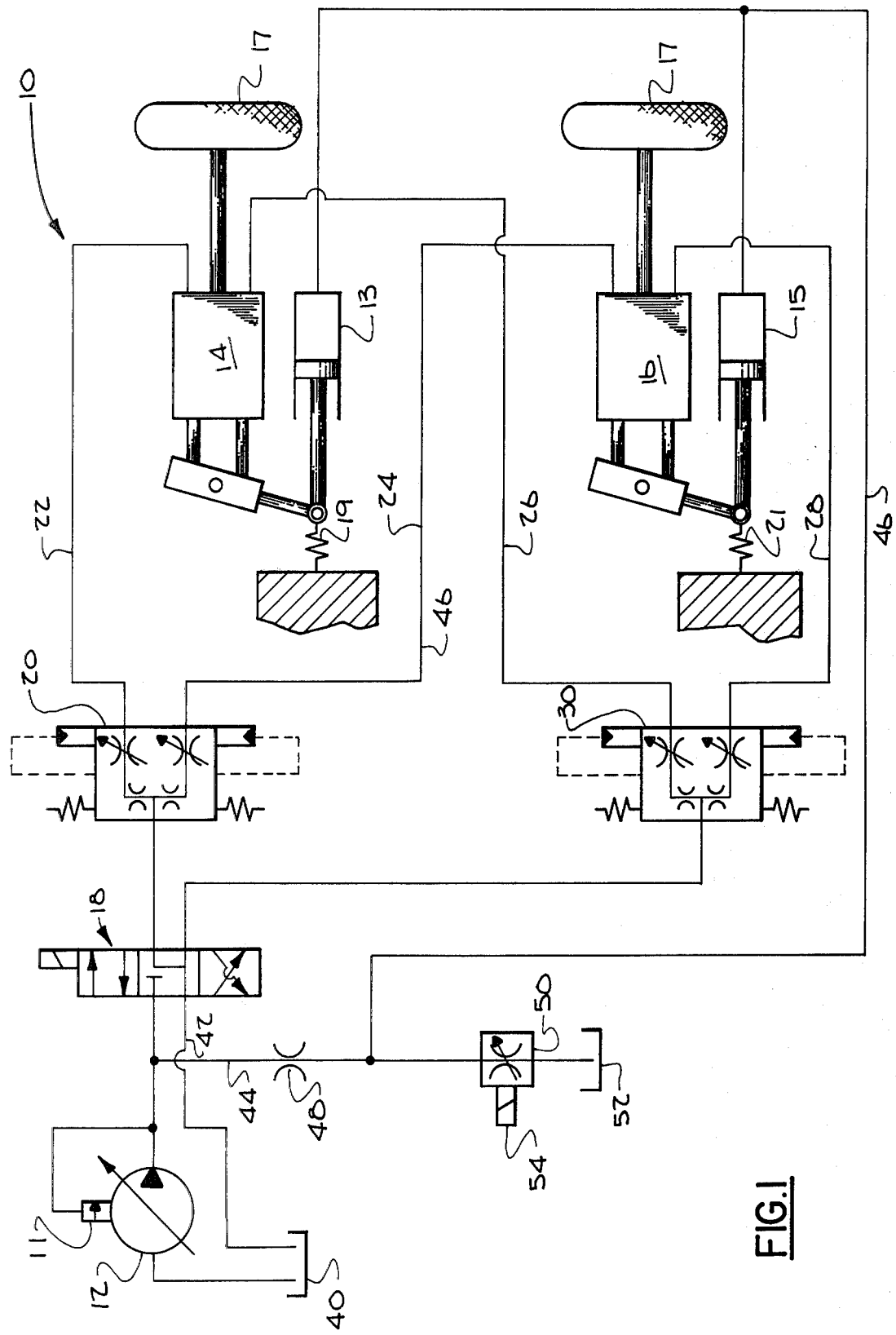
FIG. 1 is a schematic illustration of the auxiliary drive system with individual motors on each front wheel.

With reference to FIG. 1 of the drawing, the auxiliary hydraulic drive system of the present invention is generally described by reference numeral 10. The auxiliary system 10 is supplied with hydraulic energy by a pressure compensated variable displacement pump 12, which is of the axial piston type well known in the prior art. Pump 12 is driven by the power source of the tractor, not shown, which also drives the main drive wheels. Pump 12 supplies two variable displacement reversible wheel motors 14 and 16 through a selector valve 18 in a parallel circuit which branches from a divider valve 20 into individual motor lines 22 and 24 to motors 14 and 16, respectively. Motors 14 and 16 drive wheels 17, which are the steerable front wheels of the tractor. Motor return lines 26 and 28 are joined in a second divider valve 30 for return to reservoir 40 via line 38. Divider valves 20 and 30 are not described in detail, but are of the type described in U.S. Pat. No. 4,140,196. Divider valves 20 and 30 equally divide the flow from a single source to the individual motors, regardless of the flow rate, allowing a pre-arranged flow differential between the motors for cornering.

The swash plates of motors 14 and 16 are controlled by single acting servos 13 and 15, respectively. Counteracting the forces of servos 13 and 15 are compression springs 19 and 21 which are urging the swash plates of their respective motors towards a zero displacement position. Motor servos 13 and 15 are supplied by pressure from pump 12 via sensing passages 44 and 46. The means for controlling the pressure supplied servos 13 and 15 includes a fixed orifice 48 positioned upstream from a variable orifice 50 which in turn connects to drain 52. Variable orifice 50 is electrically controlled by a solenoid or linear force motor 54. By varying the restriction at orifice 50, the pressure in servos 13 and 15 can be varied.

Figure 2:
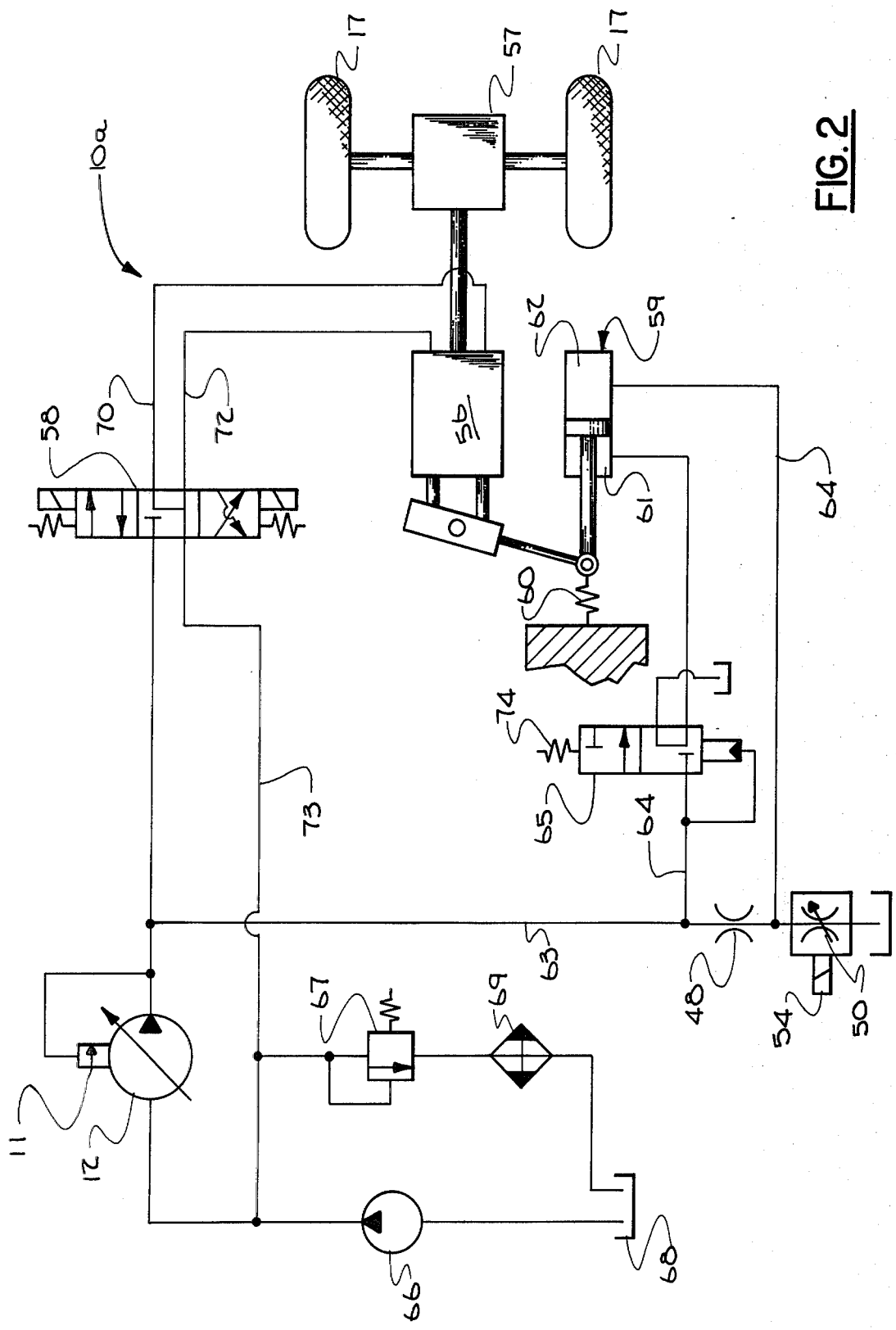
FIG. 2 is a schematic illustration of the auxiliary drive system in a modified form with a single motor driving both front wheels.

FIG. 2 is a modified form of the present invention with a single motor 56 driving a pair of tractor wheels 17 through a differential gear box 57. Pump 12, which is pressure compensated by compensator 11, supplies motor 56 through a directional control valve 58 while the swash plate of motor 56 is positioned by double acting servo 59. Compression spring 60 and servo chamber 61 both urge the swash plate of motor 56 towards a zero displacement position, while servo chamber 62 urges the swash plate towards a maximum flow position. The pressure source for servo chamber 62 is supplied from pump 12 via sensing passages 63 and 64. A means of controlling pressure in servo chamber 62 includes fixed orifice 48 and downstream variable orifice 50. By varying the voltage to solenoid 54, the pressure level in servo chamber 62 may be regulated.

The pressure in servo chamber 61 is controlled by a pressure operated valve 65 which drains servo chamber 61 at all pressure levels of pump 12 above a preset level, while opening servo chamber 61 to the pressure discharge level of pump 12 at any pressure levels below said preset level. As for example, the compensator level of pump 12 could be 2400 PSI while the compensating level of valve 65 would be 2200 PSI.

The auxiliary system 10a includes a low pressure charging pump 66 which has a capacity for supplying the full flow of pump 12 with any excess passing across relief valve 67 to reservoir 68. Located between relief valves 67 and reservoir 68 is a cooler 69.

FIGURE 1 OPERATION

When the auxiliary system 10 of the present invention is disengaged or in its freewheeling position, selector valve 18 is in its center position, as illustrated in the drawing, with both motor ports tied together in a loop while being open to drain through line 42. The system can also be neutrally positioned or disengaged by opening variable orifice 50 to its maximum flow so that the pressure in servos 13 and 15 are zero, thereby allowing springs 19 and 21 to stroke their respective motors 14 and 16 back to zero displacement. With motors 14 and 16 at zero displacement, there is no piston movement within the motor and therefore there is no flow in motor lines 22, 24, 26 and 28.

To engage the auxiliary system 10 for movement in a forward direction, selector valve 18 is shifted downwardly to its straight through position which connects pump discharge flow to divider valve 20 which in turn equally divides the flow in motor inlet lines 22 and 24 for driving the respective motors 14 and 16. The return flow in lines 26 and 28 joins together in divider valve 30 before passing through return line 42 to reservoir. As long as there is no pressure in servos 13 and 15, the motors will remain at zero stroke until the operator energizes solenoid 54. The amount of torque output from the auxiliary system is directly proportional to the voltage passing through solenoid 54. As the voltage in solenoid 54 increases, the variable restriction 50 decreases causing a proportional pressure increase in sensing passage 46 and servos 13 and 15. The operator will increase the voltage level of solenoid 54 until the motor displacement is increased to that level of torque output which the operator desires. This, of course, varies depending upon the soil conditions and load under which the tractor is being operated. As the tractor increases its speed in the main drive system, the auxiliary system 10 will automatically compensate since compensator 11 on pump 12 will increase the stroke of pump 12 so as to maintain its pressure compensating level which, for example in this case, might be 2400 PSI. Whenever it is desirous of decreasing the torque output of the auxiliary system, the operator merely reduces the current level flowing to solenoid 54 thereby causing orifice 50 to enlarge and pressure in servo 15 to drop causing motors 14 and 16 to destroke.

In the higher speed ranges of the tractor, the auxiliary system 10 may reach the point where pump 12 is at full stroke and no longer capable of maintaining the flow requirements of motors 14 and 16. By decreasing the stroke of motors 14 and 16, the auxiliary system of the present invention can be extended into these higher speed ranges even though at a reduced level of torque.

FIGURE 2 OPERATION

The auxiliary system 10a of the present invention has two manual controls; directional control valve 58 and solenoid actuated variable restriction 50. The system 10a is illustrated in a freewheeling or disengaged position with selector valve 58 centrally positioned with pump pressure blocked off while the two motor lines 70 and 72 are tied together in a loop so that the fluid can freely circulate. Also connected to the closed loop flow in the neutral position, is charging pressure from pump 66 and return line 73. In this freewheeling position, motor 56 is at full stroke due to the pressure in servo chambers 62 caused by the amount of current flowing in solenoid 54. The system 10a can also be disengaged or effectively neutrally positioned by reducing the stroke of variable displacement motor 56 to a zero flow level. This is accomplished by cutting off the current to solenoid 54, thereby opening variable orifice 50 to its largest flow path which effectively drops the pressure in sensing passage 64 and servo chamber 62 to zero or atmospheric, thereby allowing spring 60 to return the swash plate to its zero displacement no-flow position.

To engage the auxiliary system 10a for movement in a forward direction, selector valve 58 is moved downward to its straight through position which connects pump discharge flow with motor line 70 while connecting motor line 70 to return line 73. The return flow in line 73 is forced across low pressure relief valve 67 to reservoir 68 via cooler 69.

As the speed of the tractor increases due to the primary drive system, the auxiliary system 10a also speeds up since the variable displacement pump 12 is pressure compensated and compensator 11 will cause the pump to stroke-out further so as to maintain a constant pressure level, for example 2400 PSI.

The torque output of the auxiliary system 10a is directly controlled by the solenoid 54, wherein an increased current flow to solenoid 54 causes a further restriction of variable orifice 50 which in turn increases the pressure level in servo chamber 62 and causes the motor 56 to increase its stroke and torque output.

Whenever variable displacement pump 12 reaches its maximum flow level, compensator 11 can no longer maintain its constant pressure and the pump outlet pressure begins to drop. Pressure sensing valve 65 senses the pump outlet pressure through sensing passages 64 and 63 so that when the pump pressure drops below a preset level, of for example 2200 PSI, valve 65, due to the force of spring 74, will shift downwardly opening pump discharge pressure into a second servo chamber 61 causing motor 56 to destroke until pump pressure returns to its normal compensating level. Valve 65 effectively overrides the manual torque control of solenoid 54 whenever pump 12 starts to exceed its capacity.

At a low tractor speed, let's assume the operator sets the stroke of motor 56 at maximum flow so as to achieve maximum torque. The pump 12 can adequately supply the requirements of motor 56. However, as the speed of the tractor is increased, the flow demands on motor 56 are likewise increased until pump 12 had stroked out to maximum flow and can no longer maintain its constant pressure level of 2400 PSI. As pump pressure drops to the compensating level of valve 65, valve 65 shifts allowing servo cavity 61, which was previously connected to drain, to be pressurized with pump flow thereby causing the motor to decrease its stroke which in turn decreases the requirements on pump 12 allowing the pump outlet pressure to rise causing valve 65 to again shift to its original position. As the tractor further increases its speed, the effect of valve 65 is to gradually reduce the motor displacement so that pump 12 can maintain the pressure at these increased tractor speeds even though the motor stroke is being decreased.

When selector valve 58 is shifted to its criss-cross or reverse position, as seen in FIG. 2, the flow direction is from pump 12 to motor line 72 with the motor return flow in line 70 returning through line 73 to reservoir.

Having described the invention with sufficient clarity to enable those familiar with the art to construct and use it, we claim:

1. A hydraulic auxiliary drive system for the normally non-driven wheels of a vehicle in assistance with the main drive wheels, comprising:
   at least one variable displacement motor having a tiltable swash plate driving at least one of said non-driven wheels;
   a variable displacement pressure compensated pump supplying the motor with a constant pressure regardless of the vehicle speed;
   spring means biasing each motor swash plate toward zero displacement;
   servo means connected to the motor swash plate for varying displacement of the motor;
   a pressure source supplying the servo means;
   a manually operated pressure control means including a solenoid-controlled variable orifice controlling the pressure level supplied to the servo means to vary the torque output of the normally non-driven wheels; and
   control valve means positioned between the pump and motor for disengaging and reversing the auxiliary drive.

2. An auxiliary drive system as set forth in claim 1, wherein the pressure control means includes a fixed orifice upstream from said variable orifice, the variable orifice connecting the pressure source to drain.

3. An auxiliary drive system as set forth in claim 1, wherein the pressure control means includes a fixed orifice upstream from said variable orifice, the variable orifice connecting the pressure source to drain, and said pressure source is said variable displacement pump.

4. An auxiliary drive system as set forth in claim 1, wherein the pressure control means includes a fixed orifice upstream from said variable orifice, the variable orifice connecting the pressure source to drain, and said pressure source is said variable pump and includes a pressure reducing valve positioned between said pump and said servo.

5. A hydraulic auxiliary drive system for the normally non-driven wheels of a vehicle in assistance with the main drive wheels, comprising:
   at least one variable displacement motor having a tiltable swash plate, said motor driving at least one of said non-driven wheels;
   a variable displacement pressure compensated pump having a preset compensating level supplying the motor with a constant pressure regardless of the vehicle speed;
   spring means biasing each motor swash plate toward zero displacement;
   a first servo means connected to the motor swash plate for increasing the motor displacement;
   a second servo means connected to the motor swash plate for decreasing the motor displacement;
   a pressure source connected to said first servo means;
   a sensing passage connecting the pump outlet with the second servo means;
   a pressure operated valve means located in said sensing passage having a first position blocking pump pressure to the second servo means at all pressure levels above the pressure compensating level of said pump, and a second position opening pump pressure to the second servo means at a preset pressure level below said pressure compensating level of said pump whereby when said pump reaches full stroke and is unable to maintain its pressure compensating level, the pressure operated valve means opens the second servo means to pump pressure causing the motor displacement to decrease its fluid demand; and
   a manually operated pressure control means controlling the pressure level supplied to the first servo means to vary the torque output of the variable displacement motor.

6. An auxiliary drive system as set forth in claim 5, wherein the pressure control means includes a solenoid controlled variable orifice, and a fixed orifice upstream therefrom, the variable orifice connecting the pressure source to drain.

7. An auxiliary drive system as set forth in claim 5, wherein the pressure control means includes a solenoid controlled variable orifice, and a fixed orifice upstream therefrom, the variable orifice connecting the pressure source to drain, and said pressure source is said variable displacement pump.

8. An auxiliary drive system as set forth in claim 5, wherein the pressure control means includes a solenoid controlled variable orifice, and a fixed orifice upstream therefrom, the variable orifice connecting the pressure source to drain, and said pressure source is said variable pump and includes a pressure reducing valve positioned between said pump and said servo.

9. An auxiliary drive system as set forth in claim 5, including a low pressure charging pump supplying said variable displacement pump, and a motor return line connected to reservoir which includes a relief valve between the reservoir and charging pump.

10. An auxiliary drive system as set forth in claim 5, including a control valve means positioned between the pump and motor for disengaging and reversing the auxiliary drive.

11. An auxiliary drive system as set forth in claim 5, including a control valve means positioned between the pump and motor for disengaging and reversing the auxiliary drive, the control valve having a neutral position opening a closed loop between the motor intake and return lines.

* * * * *